United States Patent [19]

Briney

[11] 4,030,807
[45] June 21, 1977

[54] OPTICAL SCANNING SYSTEM WITH CANTED AND TILTED REFLECTORS

[75] Inventor: Douglas W. Briney, Yorba Linda, Calif.

[73] Assignee: General Dynamics Corporation, Pomona, Calif.

[22] Filed: Feb. 9, 1976

[21] Appl. No.: 656,557

[52] U.S. Cl. .................................. 350/7; 350/55; 250/203 R; 244/3.16
[51] Int. Cl.[2] .................... G02B 27/17; G01J 1/20
[58] Field of Search ........................... 350/7, 6, 55; 250/203 R, 235, 236; 244/3.16

[56] References Cited

UNITED STATES PATENTS

| 2,989,643 | 6/1961 | Scanlon | 350/6 |
| 3,752,998 | 8/1973 | Stripling et al. | 350/7 |
| 3,891,299 | 6/1975 | Rushing | 350/6 |

*Primary Examiner*—Jon W. Henry

[57] ABSTRACT

A target scanning system for radiation seeking guided missiles. Radiation incident on a Cassegrainian reflector system images at a focal point on a primary optic axis. The Cassegrainian reflector system produces a first scanning pattern and diverts it to a tertiary reflector. The tertiary reflector has its reflective face canted from its spin axis to produce a second scanning pattern. The two scanning patterns combine to produce the desired rosette scan that is scanned over a sensor.

9 Claims, 4 Drawing Figures

OPTICAL SCANNING SYSTEM WITH CANTED AND TILTED REFLECTORS

BACKGROUND OF THE INVENTION

In gyro-optical systems and other telescope applications, it is frequently desirable to scan the field of the optical objective across a radiation sensor to determine the orientation of the radiation source relative to the axis of the optical system. Of the various scanning patterns available, the rosette scan is particularly advantageous in that the relatively small field of view of a radiation sensor can be scanned across the entire field of the optical objective to produce a circular search pattern with a relatively large field of view.

The rosette pattern may be developed by combining two cone shaped scan patterns. There are a number of principal disadvantages to prior art methods of rosette scan generation. Some systems create distortion in the output signal due to chromatic and spherical aberation. Others tend to be mechanically impractical for fabrication on a production scale. Because the rosette pattern is the result of the addition of two concentric co-rotating or counter-rotating vectors, the magnitude of each must be established accurately by response of the separate optical component. A slight deflection error may produce an overlapped or incomplete closure of the center of the scan pattern. These effects are generally unacceptable for optimum operation of the system. The use of a refractive element for production of one of the scanning components may result in chromatic or other aberations that are largely uncorrectable. Furthermore the use of refractive elements to produce a scanning pattern tends to considerably restrict the wavelength regions over which the objective system must operate. Also, it is not economically feasible to cure these problems by resort to exotic or expensive materials. The optical design may be unnecessarily complicated when both refractive and reflective elements are involved in the process of generating the rosette scanning pattern.

There has, therefore, been a need for an optical scanning system that is relatively simple in construction, produces a predictable scanning pattern without error, is light in weight, and facilitates the reduction of data relative to the orientation of the detected target.

SUMMARY OF THE INVENTION

The present invention relates to an apparatus for determining the direction and spatial origins of a radiation source relative to the axis of an objective or scanning system.

Target information consisting of energy in the near infrared and/or ultraviolet wavebands passes into the system through a dome. The dome is an optically ground spherical cover transparent in the desired spectral regions. The target information is then reflected via a first beam director means that is of the Cassegrainian type and folds the radiation beams.

The first beam director means is mounted on a gyro fully gimbaled to permit an optical scan angle of approximately 40° in any direction from the missile axis. The first beam director means has a primary reflector formed as the forward face of a gyro-mass. The gyro-mass is permanently magnetized to act as the armature for a gyro spin motor. The gyro-mass is mounted on gyro spin bearing and is accelerated to the desire spin rate (approximately 100 Hz) by spin-up coils permanently mounted in the missile launcher. The radiant information received by the primary reflector is reflected to a secondary or convex reflector. The secondary reflector diverts the radiant energy to the Cassegrainian focal point that is located just slightly ahead of the gyro-gimbal point. An objective lens means is disposed aft of the focal point and transmits the image formed by the Cassegrainian reflector system. The primary scanning component is produced either by causing the entire primary beam director means to rotate slightly off axis by creating an out of balance condition in the gyro-mass, or by canting one of the reflectors of the primary beam director means slightly out of perpendicularity with respect to the primary optic axis.

A second beam director means, in the form of a tertiary reflector, is disposed on the primary optic axis aft of the objective lens means. The tertiary reflector has its spin axis tilted from the primary optic axis. The tertiary reflector is rotated about its spin axis by means of a small electric motor, at a rate of approximately 4.3 times faster than the rotation of the Cassegrainian reflector system. Furthermore, the beam director surface of the tertiary mirror is set at a slight angle to its spin axis to produce the second scanning component. The two scanning components combine to scan a rosette pattern.

It is therefore an object of the invention to provide a new and improved optical scanning system.

Another object of the invention is to provide a new and improved optical scanning system that is primarily reflective.

Another object of the invention is to provide a new and improved optical scanning system that eliminates chromatic and other optical aberations.

Another object of the invention is to provide a new and improved optical scanning system in which no optical component is subjected to a compound motion.

Another object of the invention is to provide a new and improved optical scanning system in which the image of the target is focused at a designated focal point.

Another object of the invention is to provide a new and improved optical scanning system that is fully gimbaled and produces a target image at a specified focal point.

Another object of the invention is to provide a new and improved optical scanning system that is compact.

Another object of the invention is to provide a new and improved optical scanning system defined by mechanical simplicity.

Another object of the invention is to provide a new and improved optical scanning system that is light in weight.

Another object of the invention is to provide a new and improved optical scanning system that is reliable in operation.

The above the other objects of the invention will be apparent as the description continues and when read in conjunction with the appended drawings.

DETAILED DESCRIPTION OF THE DRAWINGS

Figure 1:
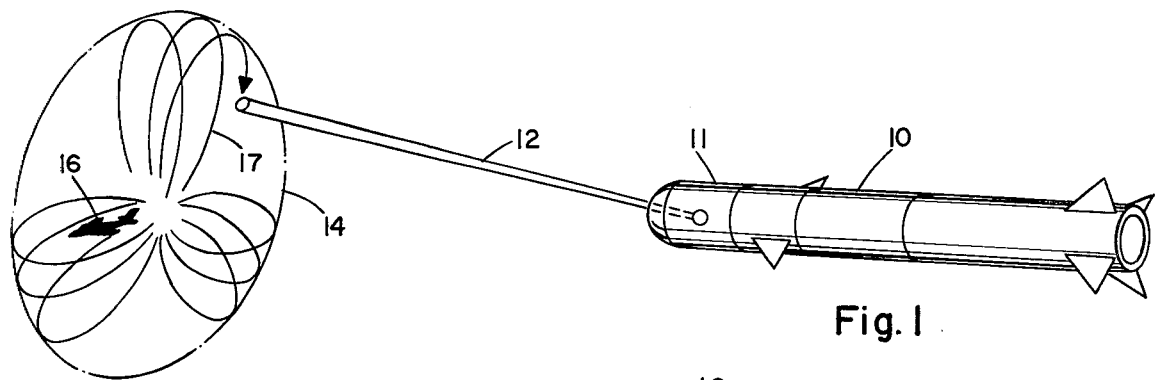
FIG. 1 illustrates the rosette scanning pattern in relation to a typical missile.

Referring now to the drawings, there is illustrated in FIG. 1 a missile 10 mounting the seeker head portion 11. The projected field of view is illustrated by the beam 12 which describes a conical pattern 14. The field of view is shown to include an intruder aircraft or target 16 at a position displaced from the centerline of the optical axis.

Figure 2:
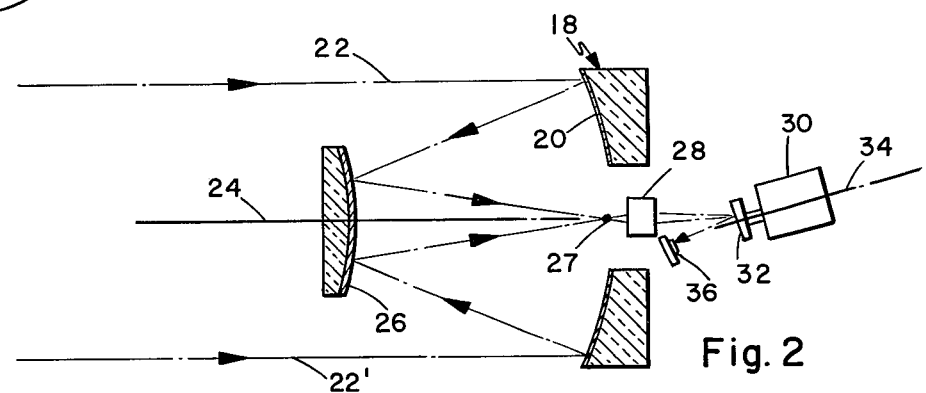
FIG. 2 is a diagram of the basic optical system.

The structure utilized to produce the rosette scanning pattern 17 viewed by a detector or sensor is illustrated diagramatically in FIG. 2. The production of the rosette scanning pattern 17 involves combining two scanning components. The first scanning component is that of a cone produced by the first beam director 18. The first beam director 18 consists of a Cassegrainian mirror system for folding the radiation beams. Such a system comprises a primary or concave reflector 20. A beam of radiation 22 is incident on the reflector 20 and diverted toward the primary optic axis 24. The radiation beam 22 strikes a secondary or convex reflector 26. The secondary reflector 26 diverts the beam 22 toward the primary optic axis 24 to focal point 27. A similar radiation beam 22' is diverted by the first beam director 18 and likewise strikes the primary optic axis 24 at the focal point 27. It follows that any and all beams of radiation are caused to image at the focal point 27 by the first beam director 18. The image focused at focal point 27 is then projected rearwardly by an apochromatic objective lens system 28.

The primary scanning component is produced by canting a reflective element either by causing the entire beam director 18 to rotate off-axis by producing an out-of-balance condition in the gyro mass or by canting the reflector 20 or 26 out of perpendicularity with the primary optic axis 24. As used hereinafter, the term "canting" refers to both ways of producing the scanning component.

A second beam director 30 is disposed on the primary optic axis 24 and receives the information projected by the objective lens system 28. It is to be noted that the information projected by the objective lens system 28 and incident on the second beam director 30 is produced in a circular pattern. The second beam director 30 is in the form of a tertiary reflector in which the reflective surface 32 is slightly canted with respect to its own spin axis 34. Also, the tertiary reflector 30 is tilted from the primary optic axis 24 to project the scan cross a sensor 36. The tertiary reflector 30 is rotated about its spin axis 34. The motion combines with the circular information pattern received by the tertiary reflector 30 into rosette pattern 17 projected over the sensor 36.

Figure 3:
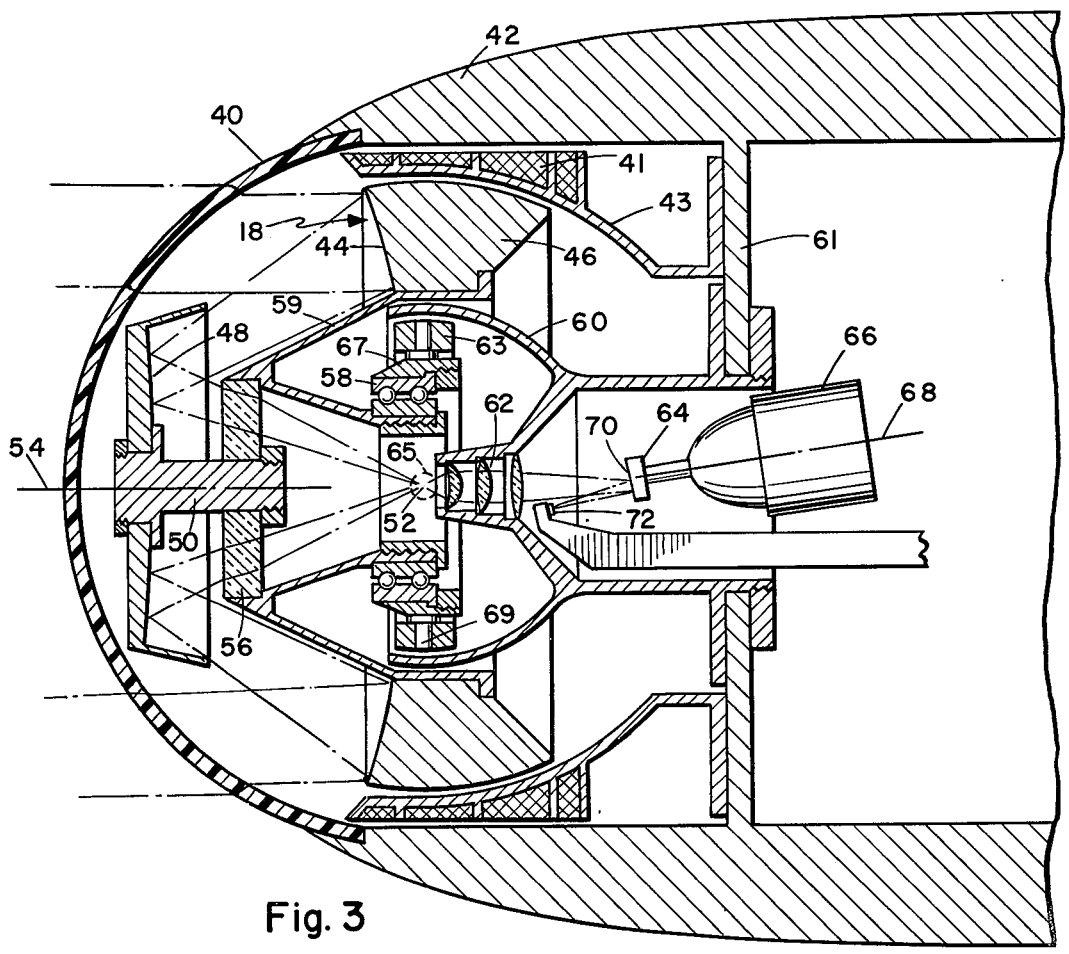
FIG. 3 is an axial sectional view of a typical seeker head incorporating the optical system.
Figure 4:
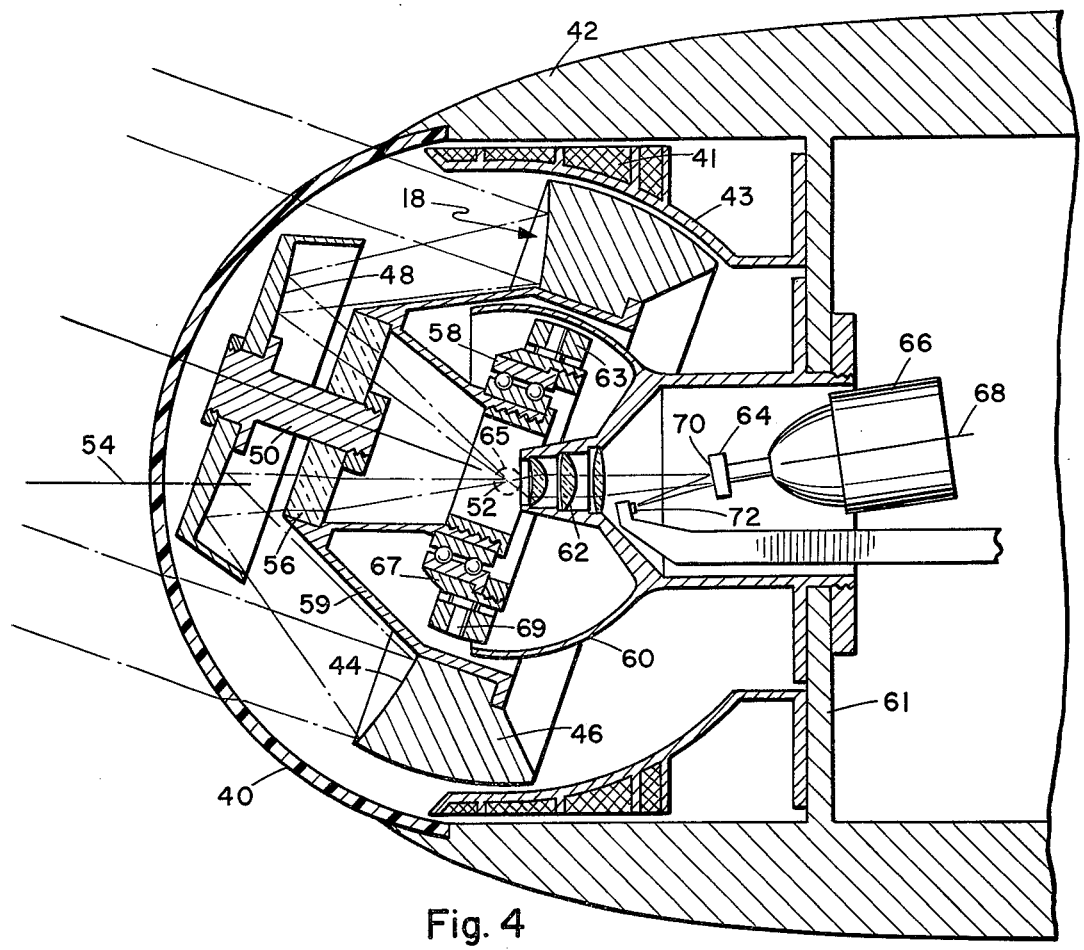
FIG. 4 is a sectional view similar to FIG. 3, but with the gimbaled mirror assembly offset.

Turning now to FIGS. 3 and 4, the manner of incorporating the optical structure of FIG. 2 in a typical missile seeker head is illustrated. According to FIGS. 3 and 4, a missile seeker dome 40 and casing 42 contain all of the structure associated with the optical scanning system. The dome 40 consists of an optically ground spherical cover fabricated from material that is optically transparent in the desired spectral regions. The dome 40 also possesses the necessary physical properties to protect the same in the environmental conditions the missile normally encounters. Precession coils 41 are carried on a coil cage 43, the coil cage being supported by a mounting bulkhead 61. A correctly phased signal is derived from external circuitry and is applied to the precession coils 41. The precession coils 41, in turn, generate the required magnetic flux to move the first beam director 18 in the proper direction to place the target 16 in the center of the rosette pattern 17.

A primary concave reflector 44 is formed as the forward face of a gyro-mass 46. The gyro-mass 46 is permanently magnetized to act as the armature for a gyro spin motor (not shown). A convex secondary reflector 48 is mounted forward of the primary reflector 44 on a post 50 fixed in a support window 56. In the illustrated embodiment, the primary reflector 44 is canted slightly out of perpendicularity with the primary optic axis. As previously discussed, the primary reflector 44 diverts radiation to the secondary reflector 48, which in turn, folds the radiation to a focal point 52. The focal point 52 lies on the primary optic axis 54 of the system. The radiation is focused at the focal point 52 via the refractive support window 56, which is mounted in a cone housing 59 extending forward from gyro-mass 46. The entire first beam director 18 rotates about a gyro-gimbal bearing 58. The gimbal housing 60 supports an outer gimbal ring 63 that is pivotal about gimbal bearing 65. The inner gimbal ring 67 is supported by the gimbal bearing 69. The gyro-gimbal bearing 58 is supported between the inner gimbal ring 67 and the cone housing 59. The gimbal housing 60 is supported by the mounting bulkhead 61. The gyro-mass 46 is accelerated to the desired spin rate (approximately 100 Hz) by spin-up coils (not illustrated) permanently mounted in the missile launcher. The entire first beam director 18 is fully gimbaled for an optical look of approximately 40° in any direction from the missile primary axis 54.

The visual information focused at focal point 52 is then projected rearwardly by the apochromatic objective lens system 62. The visual information is incident on the tertiary reflector 64. The tertiary reflector 64 is rotatably supported by a small electric motor 66 that is appropriately mounted in the seeker head. The electric motor 66 rotates the tertiary reflector 64 about the spin axis 68 at a rate that is approximately 4.3 times faster than the primary scan rate of the first beam director 18 system. The reflective surface 70 of the tertiary reflector 64 is canted slightly out of perpendicularity with respect to the spin axis 68. As a result, the radiation received by the tertiary reflector 64 in a circular pattern is transformed into a rosette pattern that is scanned across the sensor 72. To scan the information over the sensor 72, it is necessary to tilt the tertiary reflector 64 and its associated electric motor 66 with respect to the primary optic axis 54. It will be appreciated that the sensor 72 output signals contain video information concerning the shape or other spatial characteristics of the target 16 or other scene being scanned.

As is the usual practice in such systems, where a target 16 is detected as being displaced from the missile axis as illustrated in FIG. 1, the seeker head is precessed to align the primary optic axis 54 to center the target on the primary optic axis 54. Therefore, there is a look angle or disparity between the primary axis 54 and the optical axis, and the flight control of the missile introduces proportional navigational adjustments to the missile flight path to bring the primary axis 54 and optical axis into final alignment with the target 16. The desired result is obtained in the structure embodying the present invention by a simple, compact and dependable assemblage. Furthermore, since the actual rosette pattern 17 is generated by a relatively small, light weight tertiary reflector 64, the system need not compensate for imbalancing forces that would otherwise be caused by oscillating the secondary reflector 48. Therefore, flight control of the missile is greatly simplified without compromising the accuracy of the guidance system.

Having described my invention, I now claim:

1. A scanning apparatus for use in an optical seeker system comprising:
    a primary optic axis,
    first beam director means having a reflective surface canted with respect to said primary optic axis for folding and directing incident radiation,
    means for spinning said first beam director about said primary optic axis and producing a first scanning component,
    second beam director means positioned for intercepting the radiation diverted by the first beam director means, said second beam director means having a spin axis tilted with respect to said primary optic axis and including a beam director surface canted with respect to said spin axis,
    means for spinning said second beam director means about said spin axis of said second beam director for producing a second scanning component,
    a sensor positioned to receive the radiation diverted from said second beam director,
    said beam director surface further folding the incident radiation to scan the radiation over said sensor.

2. The scanning apparatus of claim 1 wherein:
    said second beam director means spins at a rate of approximately 4.3 times faster than the rate of pin of said first beam director means.

3. The scanning apparatus of claim 1 wherein: said first beam director means comprises:
    a primary reflector adapted for receiving and diverting radiation from a target,
    a second reflector for intercepting the radiant energy diverted by said primary reflector and reflecting the same to a focal point on said primary optic axis, and
    said second beam director surface comprises a tertiary reflector, the optical center of which coincides with the primary optic axis.

4. The scanning apparatus of claim 3 wherein:
    said primary and second reflectors are mounted for gyroscopic rotation in a missile seeker head,
    and said primary scanning motion is produced by imbalancing the gyroscopic mounting.

5. The scanning apparatus of claim 3 including:
    a gyro-mass mounted for spinning about the primary optic axis,
    and said primary reflector comprises a forward face of the gyro-mass.

6. The scanning apparatus of claim 1 including:
    objective lens means disposed on the primary optic axis between said first beam director means and said second beam director means for transmitting the first radiation scan component to said second beam director means.

7. The scanning apparatus of claim 6 wherein:
    said objective lens means comprises an apochromatic lens system.

8. The scanning apparatus of claim 3 wherein:
    said primary and second reflectors are mounted for gyroscopic rotation in a missile seeker head fully gimbaled to allow an optical look angle of about 40°.

9. The scanning apparatus of claim 5 including:
    a gyro spin bearing, said gyro-mass being mounted on said gyro spin bearing, and the axis of said spin bearing is co-linear with said primary optic axis.

* * * * *